United States Patent [19]

Huston, Jr.

[11] 4,287,563
[45] Sep. 1, 1981

[54] VERSATILE MICROPROCESSOR BUS INTERFACE

[75] Inventor: William D. Huston, Jr., Austin, Tex.

[73] Assignee: Motorola, Inc., Schaumburg, Ill.

[21] Appl. No.: 93,408

[22] Filed: Nov. 13, 1979

[51] Int. Cl.$^3$ ............................................. G06F 13/00
[52] U.S. Cl. .................................... 364/200; 364/900
[58] Field of Search ... 364/200 MS File, 900 MS File

[56] References Cited

U.S. PATENT DOCUMENTS

| | | | |
|---|---|---|---|
| 4,057,846 | 11/1977 | Cockerill et al. | 364/200 |
| 4,067,059 | 1/1978 | Derchak | 364/200 |
| 4,103,329 | 7/1978 | Davis | 364/200 |
| 4,110,830 | 8/1978 | Krygowski | 364/200 |
| 4,136,400 | 1/1979 | Caswell et al. | 364/900 |
| 4,167,782 | 9/1979 | Joyce et al. | 364/200 |
| 4,171,536 | 10/1979 | Phillip et al. | 364/200 |

*Primary Examiner*—Gareth D. Shaw
*Assistant Examiner*—David Ying Eng
*Attorney, Agent, or Firm*—Anthony J. Sarli, Jr.; Vincent Ingrassia; Jeffrey Van Myers

[57] ABSTRACT

There is provided a microprocessor interface circuitry which allows single peripheral and memory devices to be used with at least two different types of microprocessors. The interface includes a latch which latches the state of a control signal provided to the peripheral/memory device by the microprocessor. The control signal that is latched serves a somewhat different function when eminating from each of the at least two different microprocessors, and as such has different logic states. Logic circuitry is controlled by the latch to take at least one other control signal and generate the internal control signals used by the peripheral/memory device.

2 Claims, 7 Drawing Figures

VERSATILE MICROPROCESSOR BUS INTERFACE

This invention relates, in general, to microprocessor bus interfaces, and more particularly, to a versatile microprocessor bus interface capable of interfacing at least two different types of microprocessors to peripheral and memory devices.

The microprocessor has been catapulted into one of the most significant developments in the electronics field over the last decade. One of the reasons for this fast growth is the fact that technological advances into large scale integration have made the microprocessor the most effective, move reliable, simpliest, and least expensive way of accomplishing complex electronic functions today. The demand for the microprocessor has been so great that many manufacturers have developed microprocessors. In the last few years two of these microprocessors have become industry standards. These two are the 6800 series manufactured initially by Motorola and the 8080 series manufactured initially by Intel. A family of peripheral and memory circuits have become available from various suppliers for each of these two microprocessor families. However, each microprocessor family has a somewhat different interface bus structure so that peripheral/memory circuits made for one series of microprocessors cannot be connected directly to microprocessors in the other family. Since the bus structure of the two leadng microprocessors is so well established, it would not be feasible to change the design of one of the bus structures to be compatible with the other. Therefore, it should be appreciated that it would be desirable to have an interface circuit which would allow each of the two leading microprocessors to be connected to the same peripheral/memory circuit.

Accordingly, it is an object of the present invention to provide a versatile microprocessor bus interface which allows the connection of a single memory or peripheral circuit to microprocessors having different bus structures.

Another object of the present invention is to provide a versatile microprocessor bus interface circuit which can be used externally to a peripheral/memory circuit or can be manufactured as part of the peripheral/memory circuit chip.

SUMMARY OF THE INVENTION

In carrying out the above and other objects of the present invention, there is provided in one form, a versatile microprocessor bus interface capable of interfacing a memory/peripheral circuit to at least two different microprocessors. The interface circuit will provide the control signals required within the memory/peripheral circuit, provided the microprocessor supplies at least three input control signals to the interface circuit. The first of the three input signals (actually only two are needed by a read-only peripheral or memory) required is an address strobe signal which indicates that an address is present on an output bus of the microprocessor. The second and third input control signals are different among the at least two different types of microprocessors that may be connected. The interface circuit includes a latch circuit which saves the state of one of the input control signals when the address strobe signal is in an active state. Logic circuitry is controlled by the outputs from the latch circuit, and uses the input control signals to generate the read enable and write enable signals to the remainder of the peripheral/memory circuit.

DETAILED DESCRIPTION OF THE DRAWINGS

Figure 1:
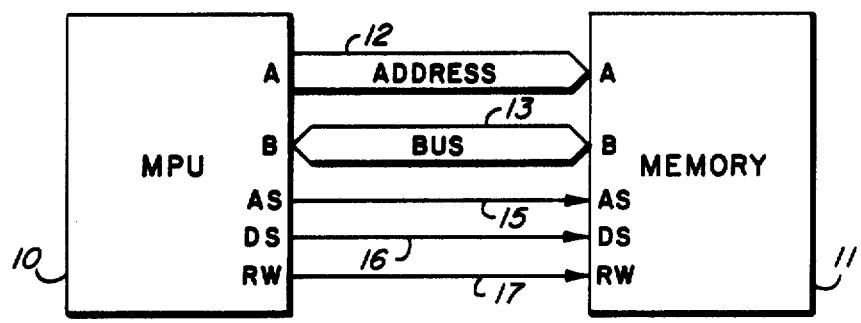
FIG. 1 illustrates in block diagram form a microprocessor interfaced to a memory device.
Figure 2:
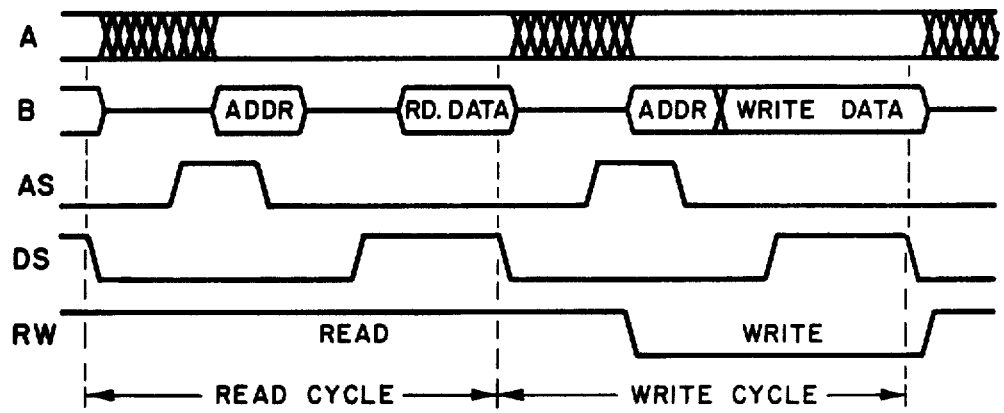
FIG. 2 illustrates in timing waveform manner the signals carried by the interface lines shown in FIG. 1.
Figure 3:
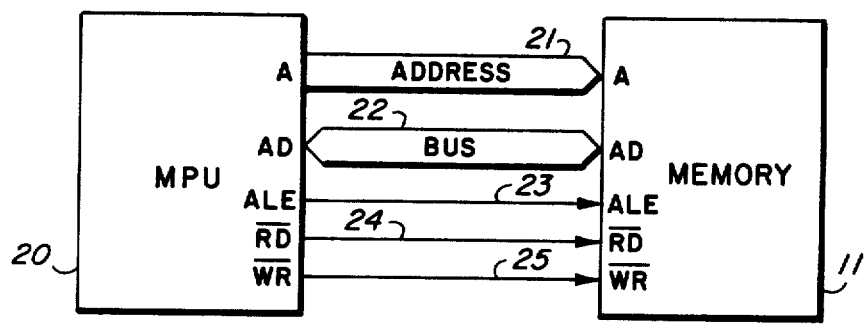
FIG. 3 shows yet another microprocessor interfaced to a memory device.
Figure 4:
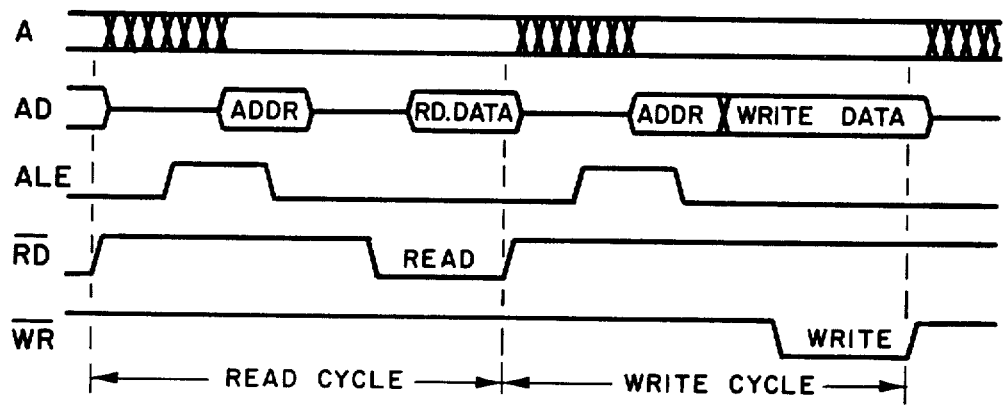
FIG. 4 shows in timing waveform manner signals carried by the interface lines shown in FIG. 3.

The incompatibility of bus structures between different microprocessors is a problem to microprocessor users. FIGS. 1-4 show the signal relationships of two different microprocessor bus structures. FIGS. 1 and 2 show a representation of the signal relationships of part of the bus structures of an MC6801 microprocessor (MPU), and FIGS. 3 and 4 show the signal relationship of part of the bus structure of an 8085 microprocessor. Both microprocessors multiplex low order address bits with data on a single bus. The present invention is equally applicable to input/output peripheral circuits as well as all forms of microprocessor memories. The word "memory" is used herein to refer to all types of memory and/or peripheral circuits.

Referring first to FIG. 1, MPU 10 is shown having an address bus 12 which is used to carry the high order address bits to a peripheral/memory device illustrated as memory 11. The lower address bits are carried on bus 13 which also carries data, and therefore bus 13 is said to be a multiplexed bus since it is time shared between carrying data and addresses. MPU 10 supplies three control signals to memory 11. The first control signal is an address strobe signal, AS, which is carried on line 15 and indicates that multiplexed bus 13 is currently carrying an address. A data strobe signal, DS, is carried on line 16 and is used by memory 11 to strobe data on and off bus 13. A read/write signal is carried by line 17 and indicates whether data carried by bus 13 is read data or write data. Address bus 12 and multiplexed bus 13 each include a plurality of bits of information, on multiple wires.

Referring now to FIG. 2 the top signal labeled A represents the timing relationship of the address bits carried on address bus 12. The address signals carried by address bus 12 appear after the beginning of each bus cycle and remain valid through the end of that bus cycle. The second waveform labeled B represents the timing relationship of the information carried on multiplexed bus 13. The waveform labeled AS represents the timing relationship of information carried on line 15, the waveform labeled DS represents the timing relationship of information carried on line 16, and the waveform labeled RW represents the information carried on line 17. It will be noted that the address appears on bus 13 during the first portion of the bus read cycle and data is carried by bus 13 during the second portion of the bus read cycle. During a write cycle, the microprocessor simply switches from driving addresses on bus 13 to driving the write data word between the first and second portions of the write cycle. Note that the write data is stable during the falling edge of the signal and that the RW signal is low and stable during the entire positive period of DS. During a read bus cycle the microprocessor must cease driving bus 13 after the address time to permit the memory device to drive the bus with the read data word. The MPU ceases driving address on bus 13 after AS but before the beginning of DS. The memory uses the positive level of DS plus a high on RW to drive read data onto bus 13. The MPU must provide a stable RW during the entire positive period of DS.

FIGS. 3 and 4 illustrate a portion of the bus structure and associated signals of a microprocessor 20 which is somewhat different from microprocessor 10 in FIG. 1. Microprocessor 20 provides an address bus 21 which carries high order address bits to a peripheral device illustrated as memory 11. Bus 22 is a multiplexed bus which carries the low order address bits and data between microprocessor 20 and memory 11. Address bus 21 and multiplexed bus 22 are each capable of carrying a plurality of bits of information and each bus serves the same functions as corresponding buses 12 and 13 in FIG. 1. Line 23 carries an address latch enable signal, ALE, from microprocessor 20 to memory 11 which is identical in function to the address strobe of microprocessor 10 (FIG. 1). The address latch enable signal on line 23 tells memory 11 when the multiplexed address is present on bus 22. A second control signal provided by microprocessor 20 to memory 11 is a read signal carried on line 24. A third control signal is a write signal carried by line 25 from microprocessor 20 to memory 11. The control signals carried by lines 24 and 25 are somewhat different from the signals carried by lines 16 and 17 of FIG. 1, although the information content is the same. The two signals carried by lines 16 and 17 and the two signals carried by lines 24 and 25 convey three things to memory 11. First, the signals distinguish between a read cycle and a write cycle. Secondly, for a read cycle, memory 11 is told when to gate data onto bidirectional multiplexed bus 13 or 22 respectively. And third, for a write cycle, memory 11 gets a pulse edge to use to latch the write data word within memory 11.

FIG. 4 illustrates the timing relationships of the portion of the bus structure illustrated in FIG. 3. The top waveform A illustrates the timing relationship, in the bus cycle, of the high order address bits on address bus 21. The second waveform AD illustrates the timing relationship of the low order address bits and data carried by multiplexed bus 22. The address latch enable waveform, ALE, shows the timing relationship of the signal carried on line 23 and indicates that microprocessor 20 is providing a stable addresss on multiplexed bus 22 during the high to low transition of the address latch enable signal. The top three waveforms of FIG. 4 appear similar to the top three waveforms of FIG. 2 and serve identical functions. Waveform $\overline{RD}$ is a read signal carried by line 24, and waveform $\overline{WR}$ is a write signal carried by line 25. The read and write signals of FIG. 4 are similar in function to the data strobe and read/write signals of FIG. 2. However, the read signal, $\overline{RD}$, is inverted from the data strobe signal, DS, the $\overline{RD}$ signal does not appear during a write as DS does and the write signal, $\overline{WR}$, is not as long as the write portion of the read/write signal RW of FIG. 2. The write signal switches low during the second portion of the bus cycle. The read signal, $\overline{RD}$, is used by memory 11 to gate read data to the bus. The trailing edge (low to high transition) of the write signal $\overline{WR}$ is used by memory 11 to latch data from bus 22.

Figure 5:
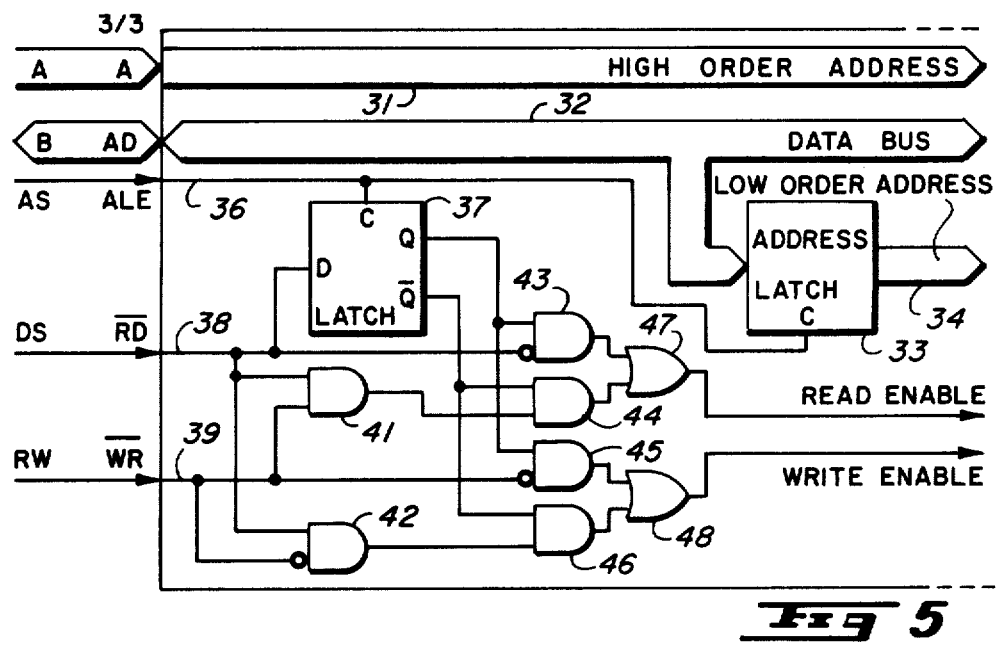
FIG. 5 shows in logic diagram form an embodiment of the present invention in one form thereof.

FIG. 5 illustrates in logic diagram form a versatile microprocessor bus interface which allows a memory or peripheral device to connect directly to microprocessors having both types of control signals illustrated in FIGS. 1 and 2 and in FIGS. 3 and 4 without adding any additional signal pins. It will be understood that there is other logic circuitry which can be used to perform the function of the logic circuitry illustrated in FIG. 5 even to the point of forming the latch circuit with back-to-back inverters and using transmission gates in conjunction with NAND gates to achieve the same overall result. Only one version of the logic circuit is illustrated since illustrating all possible alternate circuitry would not add to the understanding of the present invention. The basic logic circuitry required has to take the three input signals and provide the internal signals required of a memory or peripheral, in this case illustrated as read enable and write enable output signals. In addition, it must be kept in mind that during address strobe/address latch enable signals the data strobe signal is always low and the read signal, $\overline{RD}$, is always high. A peripheral/memory device having the versatile microprocessor bus interface circuitry receives the read signal. $\overline{RD}$, and the data strobe signal, DS, on the same pin. The state of the data strobe signal/read signal pin is latched on the falling edge of the address strobe/address latch enable signal. The logic circuitry illustrated can be made up of external interface devices or can be integrated as part of the peripheral/memory device chip.

The high order address bits from either microprocessor are received on high order address bus 31. The multiplexed bus is connected to bus 32 of the interface circuitry. Bus 32 provides an input to address latch 33 which provides the low order address bits on bus 34. Address latch 33 is used to provide low order address bits throughout the bus cycle as is provided on bus 31 for the high order address bits. Line 36 of the interface circuitry receives address strobe, AS, when microprocessor 10 is connected to the interface circuitry and receives address latch enable signal, ALE, from microprocessor 20 when it is being used with the interface circuitry. Line 38 receives the data strobe signal, DS, from microprocessor 10 or the read signal, $\overline{RD}$, from microprocessor 20. Line 39 receives the read/write signal, RW, from microprocessor 10 or the write signal, $\overline{WR}$, from microprocessor 20. Line 36 is connected to a clock input C of a latch 37, while line 38 is connected to a data input D of latch 37. The state of the signal on line 38 is allowed to enter latch 37 when the signal on line 36 is high and is latched into latch 37 upon the falling edge of the signal on line 36. The output of latch 37 indicates which microprocessor is connected to the interface circuitry. As an example, when the Q output is high microprocessor 20 is connected to the interface circuitry or when output $\overline{Q}$ is high, which means that output Q would be low, then microprocessor 10 is connected to latch 37. Latch 37 remains stable for the remainder of the bus cycle to permit the logic circuitry to interpret the two control signals received on lines 38 and 39. The Q output of latch 37 is coupled to an input of AND gate 43 and to an input of AND gate 45. AND gates 43 and 45 each have a second input which is an inverting input. The inverting input of AND gate 43 is coupled to line 38, and the inverting input of AND gate 45 is coupled to line 39. The Q output of latch 37 is coupled to an input of AND gate 44 and to an input of AND gate 46. Line 38 also goes to an input of AND gate 41, and to an input of AND gate 42. Line 39 goes to a second input of AND gate 41 and to a second input of AND gate 42 where the second input of AND gate 42 is an inverting input. An inverting input means that the AND gate first inverts the input signal and then treats the inverted input in a normal manner. The output of AND gate 41 is connected to a second input of AND gate 44, and the output of AND gate 42 is connected to a second input of AND gate 46. The output of AND gate 43 and the output of AND gate 44 are each connected to inputs of an OR gate 47. OR gate 47 provides a read enable output. The output of AND gate 45 and the output of AND gate 46 are both coupled to inputs of OR gate 48. OR gate 48 provides a write enable output.

Figure 6:
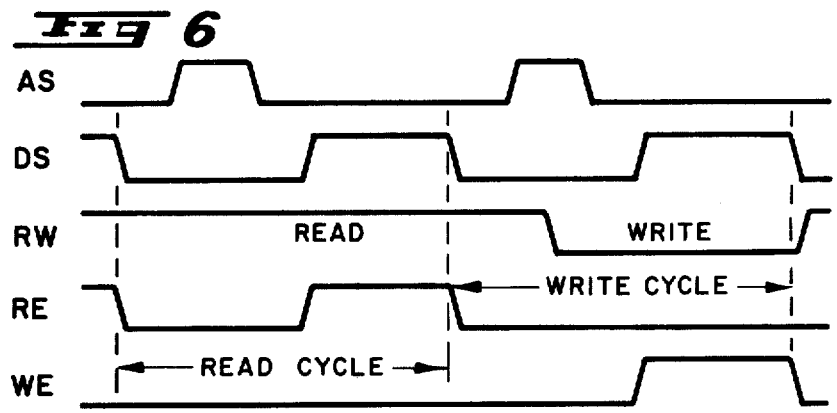
FIG. 6 shows in timing waveform manner some of the signals necessary in understanding the operation of the circuit of FIG. 5.
Figure 7:
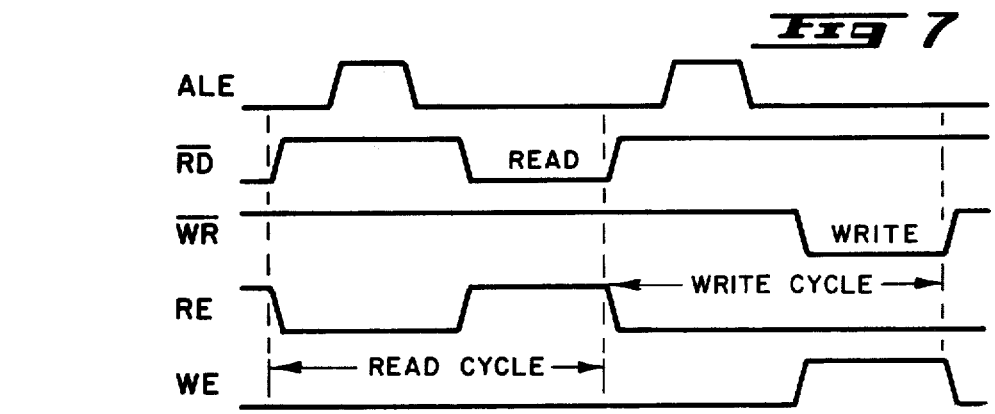
FIG. 7 also shows some timing waveforms useful in understanding the operation of the circuit of FIG. 5.

FIG. 6 illustrates the three control signals provided by microprocessor 10, the read enable signal, RE, provided by OR gate 47, and the write enable signal, WE, provided by OR gate 48. FIG. 7 illustrates the three control signals provided by microprocessor 20 and the read enable signal and write enable signal provided by the interface circuitry in response to the three control signals. It should be noted that in both cases the read enable signal and the write enable signal are identical.

The logic circuitry permits the interface circuit to connect to two different types of bus control signals while latch 37 stores the distinction between the two different buses. Once the bus type is known one of two sets of control signal interpretation gates are selected. When latch 37 indicates that a microprocessor like MPU 20 is connected, the gating circuitry inverts $\overline{RD}$ and $\overline{WR}$ to respectively produce read enable and write enable. When an MPU 10 type microprocessor is connected read enable becomes the AND of DS and RW while write enable is the AND of DS and the inverse of RW. By now, it should be appreciated that there has been provided a versatile microprocessor bus interface which allows the use of a single peripheral/memory device to be used with two different types of microprocessors which provide somewhat different control signals. Although the control signals are somewhat different their function is essentially the same.

I claim:

1. A versatile microprocessor bus interface for interfacing an external memory/peripheral to a first microprocessor or to a second microprocessor wherein the first microprocessor provides a first bus carrying high order address bits, a multiplexed bus alternately carrying data or lower order address bits, an address strobe signal which indicates when the multiplexed bus is carrying the lower order address, a data strobe signal which controls reading and writing data from the external memory/peripheral, and a read/write signal which indicates whether the mutliplexed bus is carrying read data or write data, and wherein the second microprocessor provides a second bus carrying high order address bits, a multiplexed bus alternately carrying data or lower order address bits, an address latch enable signal which indicates when the multiplexed bus is carrying the lower order address, a read signal which indicates by its complement when the multiplexed bus is to carry read data from the memory/peripheral, and a write signal which indicates by its complement when the multiplexed bus is carrying write data, the interface comprises: a latch for receiving the data strobe signal or the read signal and being clocked by the address strobe signal or the address latch enable signal, the latch providing an output control signal; a first logic means providing a read enable signal when the data strobe and the read/write signals are both logic level highs or when the read signal is a logic level low, the read enable signal being gated through the first logic means by a control output of the latch; and a second logic means providing a write enable signal when the data strobe is a logic level high and the read/write signal is a logic level low or when the write signal is a logic level low, the write enable signal being gated through the second logic means by the output control of the latch.

2. A versatile microprocessor bus interface useful for interfacing at least two different microprocessors to a single peripheral/memory device wherein the microprocessors provide at least three control signals which may have logic states which are non-compatible among the microprocessors, the interface comprising: a first, a second, and a third control input for receiving the at least three control signals; a latch means having a clocking input, a data input and a first and a second output, the clocking input being coupled to the first control input, and the data input being coupled to the secnd control input; a first logic means having inputs coupled to the second and third control inputs and providing an output; a second logic means having an input coupled to the second control input and having an inverting input coupled to the third control input; third logic means controlled by the first and second output from the latch means and providing a read enable output function, the third logic means receiving an input from the second control input and an input from the outut of the first logic means; and fourth logic means controlled by the first and second outputs of the latch means and having an input from the third control input and an input from an output of the second logic means, the fourth logic means providing a write enable output function.

* * * * *

UNITED STATES PATENT AND TRADEMARK OFFICE
CERTIFICATE OF CORRECTION

PATENT NO. : 4,287,563
DATED : 01 September 1981
INVENTOR(S) : William D. Huston, Jr.

It is certified that error appears in the above-identified patent and that said Letters Patent are hereby corrected as shown below:

Column 6, line 15, change "comprises" to --comprising--.

Column 6, line 39, change "secnd" to --second--.

Signed and Sealed this

Thirtieth Day of August 1983

[SEAL]

Attest:

GERALD J. MOSSINGHOFF

*Attesting Officer*     *Commissioner of Patents and Trademarks*